US009464931B2

(12) United States Patent
Kikuchi et al.

(10) Patent No.: US 9,464,931 B2
(45) Date of Patent: Oct. 11, 2016

(54) COMBINATION WEIGHER

(71) Applicant: YAMATO SCALE CO., LTD., Akashi-shi, Hyogo (JP)

(72) Inventors: Kohei Kikuchi, Akashi (JP); Kazuo Takayanagi, Akashi (JP)

(73) Assignee: YAMATO SCALE CO., LTD., Akashi-shi, Hyogo (JP)

( * ) Notice: Subject to any disclaimer, the term of this patent is extended or adjusted under 35 U.S.C. 154(b) by 76 days.

(21) Appl. No.: 14/540,636

(22) Filed: Nov. 13, 2014

(65) Prior Publication Data

US 2015/0226600 A1 Aug. 13, 2015

(30) Foreign Application Priority Data

Feb. 7, 2014 (JP) ................................. 2014-021892

(51) Int. Cl.
*G01G 19/393* (2006.01)
*B65G 11/00* (2006.01)
*B65G 11/18* (2006.01)
*B65G 47/18* (2006.01)

(52) U.S. Cl.
CPC ............. *G01G 19/393* (2013.01); *B65G 11/00* (2013.01); *B65G 11/18* (2013.01); *B65G 47/18* (2013.01)

(58) Field of Classification Search
CPC .. G01G 19/387; G01G 19/393; B65G 11/00; B65G 11/18; B65G 47/18
See application file for complete search history.

(56) References Cited

U.S. PATENT DOCUMENTS

| | | | | |
|---|---|---|---|---|
| 4,558,774 A | * | 12/1985 | Mikami | G01G 13/16 177/25.18 |
| 4,602,709 A | * | 7/1986 | Ueda | G01G 19/393 177/25.18 |
| 4,614,262 A | * | 9/1986 | Konishi | G01G 19/393 177/25.18 |
| 4,693,355 A | * | 9/1987 | Bochi | G01G 19/32 177/18 |
| 4,844,190 A | * | 7/1989 | Mikami | G01G 19/393 177/25.18 |
| 8,115,118 B2 | * | 2/2012 | Kawanishi | G01G 19/393 177/25.18 |
| 9,267,838 B2 | * | 2/2016 | Takayanagi | G01G 19/393 |
| 2009/0294183 A1 | * | 12/2009 | Kawanishi | G01G 19/393 177/25.18 |
| 2013/0284523 A1 | * | 10/2013 | Takayanagi | G01G 19/393 177/162 |
| 2014/0238537 A1 | * | 8/2014 | Kikuchi | G01G 19/393 141/83 |

FOREIGN PATENT DOCUMENTS

| | | |
|---|---|---|
| JP | 08-152353 | 6/1996 |
| JP | 2008-020269 A | 1/2008 |
| JP | 2013-092408 A | 5/2013 |
| WO | WO-2012/056488 A1 | 5/2012 |

* cited by examiner

*Primary Examiner* — Randy W Gibson

(74) *Attorney, Agent, or Firm* — Marshall, Gerstein & Borun LLP

(57) ABSTRACT

A combination weigher comprises hoppers divided into a first group and a second group; an inner funnel which collects objects discharged inward from the hoppers and discharges the objects through an opening; a first outer funnel which is placed along a first side of the inner funnel, and collects objects discharged outward from the hoppers in the first group; a second outer funnel which is placed along a second side of the inner funnel, and collects objects discharged outward from the hoppers in the second group; and a partition plate which separates an inner region of the inner funnel into a first region corresponding to the hoppers in the first group and a second region corresponding to the hoppers in the second group, and separates the opening into a discharge outlet corresponding to the first side and a discharge outlet corresponding to the second side.

6 Claims, 8 Drawing Sheets

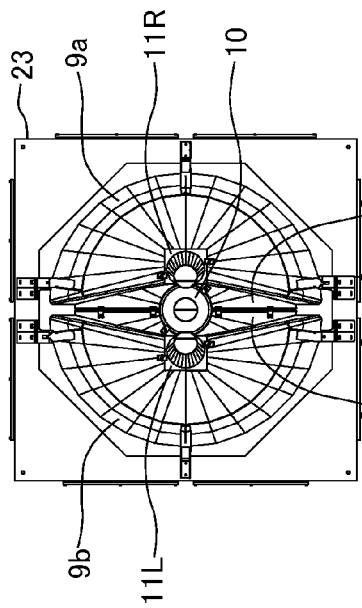
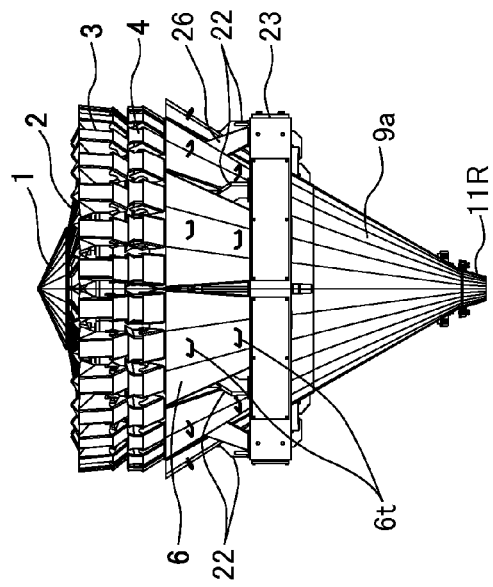
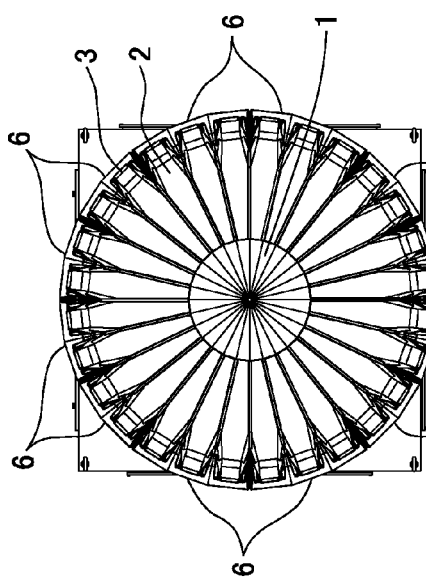
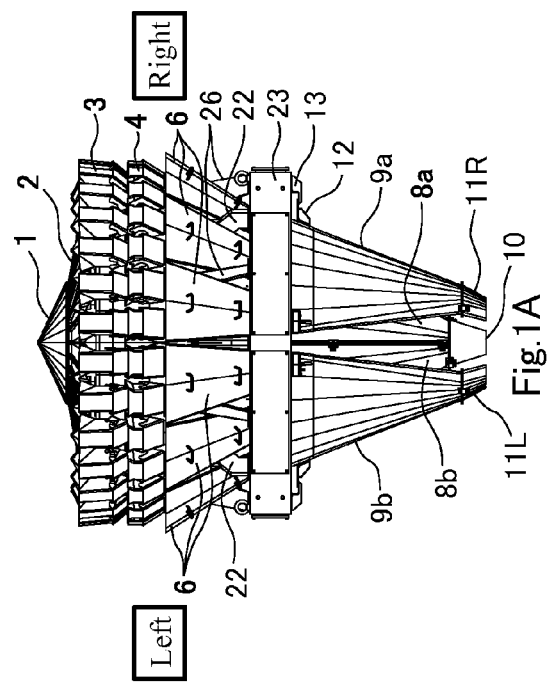

COMBINATION WEIGHER

BACKGROUND OF THE INVENTION

1. Field of the Invention

The present invention relates to a combination weigher including a plurality of discharge paths.

2. Description of the Related Art

Conventionally, there is known a combination weigher in which combination calculation is performed by using the weights of objects held in a plurality of weighing hoppers to find weighing hoppers making up a combination in which the total weight of the objects falls within a predetermined weight range, and the objects are discharged from the weighing hoppers making up the combination, collected by a collecting chute, and discharged to a packaging machine, or the like.

The combination weigher is provided with a plurality of discharge paths of the objects to improve a processing ability (e.g., see International Application Publication No. 2012/056488, Japanese Laid-Open Patent Application Publication No. 2013-092408, Japanese Laid-Open Patent Application Publication No. 2008-20269, Japanese Laid-Open Patent Application Publication No. Hei. 8-152353).

For example, International Application Publication No. 2012/056488 and Japanese Laid-Open Patent Application Publication No. 2013-092408 disclose a combination weigher including three discharge paths. In this combination weigher, each of a plurality of weighing hoppers is provided with an inner gate which opens inward and an outer gate which opens outward. Below the plurality of weighing hoppers, a collecting chute including an inner funnel and two outer funnels is provided such that the two outer funnels are placed around the inner funnel. The objects are discharged through discharge outlets of these three funnels.

Below the combination weigher, for example, a packaging machine including three inlets is placed. The objects discharged through the three discharge outlets of the combination weigher are fed into the corresponding inlets of the packaging machine and packaged in the packaging machine.

SUMMARY OF THE INVENTION

In the combination weigher including the three discharge outlets disclosed in International Application Publication No. 2012/056488 and Japanese Laid-Open Patent Application Publication No. 2013-092408, the objects can be discharged to three locations and therefore the combination weigher can be adapted to, for example, the packaging machine including the three inlets. However, for example, in a case where the packaging machine including the three inlets is changed into a packaging machine including four inlets in order to improve a productivity, the combination weigher including the three discharge outlets must also be changed into a combination weigher including four discharge outlets, and as a result, cost increases. In a case where the number of discharge outlets is changed in this way, it becomes necessary to change the collecting chute, and a long time is required to design the collecting chute.

Japanese Laid-Open Patent Application Publication No. 2008-20269 and Japanese Laid-Open Patent Application Publication No. Hei. 8-152353 disclose the collecting chute including the inner funnel and the two outer funnels. A plurality of discharge outlets of the collecting chute are provided with a discharge device such as a collecting hopper to discharge sorted objects in different directions. This discharge device is complex in configuration and control. These publications do not disclose the configuration for discharging the objects to four locations.

The present invention has been developed to solve the above described problems, and an object of the present invention is to provide a combination weigher which allows objects to be discharged selectively to three locations or to four locations with a simple configuration.

To achieve the above described object, according to an aspect of the present invention, a combination weigher comprises a plurality of hoppers which are arranged in an annular shape and discharge objects held therein selectively inward or outward in the annular shape, the plurality of hoppers being divided into a first group and a second group; an inner funnel which collects the objects discharged inward from the hoppers and discharges the objects through an opening at a lower end thereof; a first outer funnel which is placed along a first side of the inner funnel, collects the objects discharged outward from the hoppers in the first group, and discharges the objects through a discharge outlet at a lower end thereof; a second outer funnel which is placed along a second side of the inner funnel, collects the objects discharged outward from the hoppers in the second group, and discharges the objects through a discharge outlet at a lower end thereof; and a partition plate which is placed inside the inner funnel, separates an inner region of the inner funnel into two regions which are a first region corresponding to the hoppers in the first group and a second region corresponding to the hoppers in the second group, and separates the opening of the inner funnel into a discharge outlet corresponding to the first side and a discharge outlet corresponding to the second side.

In accordance with this configuration, since the partition plate is provided inside the inner funnel, the objects discharged inward from the hoppers in the first group are discharged through the region corresponding to the first side and the discharge outlet corresponding to the first side, while the objects discharged inward from the hoppers in the second group are discharged through the region corresponding to the second side and the discharge outlet corresponding to the second side. This makes it possible to discharge the objects discharged inward from the hoppers in the first group and the objects discharged inward from the hoppers in the second group such that the objects in the first group are separate from the object in the second group. For example, by mounting two small funnels or the like corresponding to the discharge outlets to the opening of the inner funnel, the objects can be discharged to two locations. The discharge outlet corresponding to the first side and the discharge outlet corresponding to the second side are adjacent to each other. Therefore, for example, by mounting one small funnel or the like to the opening of the inner funnel, the objects can be discharged to one location. The objects discharged through the discharge outlets of the first and second outer funnels are discharged to two locations. Thus, by merely changing the funnel mounted to the opening of the inner funnel, the objects can be discharged selectively to three locations or to four locations. Or, small funnels may be mounted to the discharge outlets of the first and second outer funnels, respectively, as necessary. The small funnels mounted to the inner funnel, and the first and second outer funnels may be tubular. Therefore, configuration is simplified. In addition, control for them is not necessary.

The combination weigher may further comprise a mode select unit for selecting one operation mode from among a plurality of operation modes including a first operation mode and a second operation mode; a combination unit which performs: a first combination process in which a combination of the hoppers which discharge the objects is found from among the hoppers in the first group and decided as a first outer discharge combination, a combination of the hoppers which discharge the objects is found from among the hoppers in the second group and decided as a second outer discharge combination, and a combination of the hoppers which discharge the objects is found from among the hoppers in the first group and the hoppers in the second group and decided as an inner discharge combination, when the mode select unit selects the first operation mode, and a second combination process in which two combinations of the hoppers which discharge the objects are found from among the hoppers in the first group, one of the two combinations is decided as a first outer discharge combination, the other of the two combinations is decided as a first inner discharge combination, two combinations of the hoppers which discharge the objects are found from among the hoppers in the second group, one of the two combinations is decided as a second outer discharge combination, and the other of the two combinations is decided as a second inner discharge combination, when the mode select unit selects the second operation mode; and a control unit which performs: a discharge process in which the hoppers selected to make up the first outer discharge combination discharge the objects outward, the hoppers selected to make up the second outer discharge combination discharge the objects outward, and the hoppers selected to make up the inner discharge combination discharge the objects inward, when the combination unit performs the first combination process, and a discharge process in which the hoppers selected to make up the first outer discharge combination discharge the objects outward, the hoppers selected to make up the second outer discharge combination discharge the objects outward, the hoppers selected to make up the first inner discharge combination discharge the objects inward, and the hoppers selected to make up the second inner discharge combination discharge the objects inward, when the combination unit performs the second combination process.

In accordance with this configuration, when the first operation mode is selected, the objects discharged from the hoppers selected to make up the first outer discharge combination slide down on the first outer funnel and are discharged, while the objects discharged from the hoppers selected to make up the second outer discharge combination slide down on the second outer funnel and are discharged. Also, the objects discharged from the hoppers selected to make up the inner discharge combination slide down on the inner funnel and are discharged. On the other hand, when the second operation mode is selected, the objects discharged from the hoppers selected to make up the first outer discharge combination slide down on the first outer funnel and are discharged, while the objects discharged from the hoppers selected to make up the second outer discharge combination slide down on the second outer funnel and are discharged. Also, the objects discharged from the hoppers selected to make up the first inner discharge combination slide down on the region of the inner funnel corresponding to the first side and are discharged, while the objects discharged from the hoppers selected to make up the second inner discharge combination slide down on the region of the inner funnel corresponding to the second side and are discharged.

The combination weigher may further comprise, when the mode select unit selects the first operation mode, a tubular lower funnel which is removably mounted to the opening at the lower end of the inner funnel and through which the objects discharged through the discharge outlet of the inner funnel corresponding to the first side and the discharge outlet of the inner funnel corresponding to the second side are moved down; a tubular lower funnel which is removably mounted to the discharge outlet at the lower end of the first outer funnel; and a tubular lower funnel which is removably mounted to the discharge outlet at the lower end of the second outer funnel.

In accordance with this configuration, since the three lower funnels having a simple structure are mounted to the inner funnel, and the first and second outer funnels, the objects can be guided to desired three discharge locations.

The combination weigher may further comprise, when the mode select unit selects the second operation mode, a joint funnel including a first tubular funnel section through which the objects discharged through the discharge outlet of the inner funnel corresponding to the first side are moved down and a second tubular funnel section through which the objects discharged through the discharge outlet of the inner funnel corresponding to the second side are moved down such that the first and second tubular funnel sections are joined to each other, the joint funnel being removably mounted to the opening at the lower end of the inner funnel; a tubular lower funnel which is removably mounted to the discharge outlet at the lower end of the first outer funnel; and a tubular lower funnel which is removably mounted to the discharge outlet at the lower end of the second outer funnel.

In accordance with this configuration, since the joint funnel and the two lower funnels having a simple structure are mounted to the inner funnel, and the first and second outer funnels, the objects can be guided to desired four discharge locations.

The combination weigher may further comprise a plurality of upper chutes provided above the inner funnel and the first outer funnel or the second outer funnel, each of the plurality of upper chutes including an inner chute section for guiding the objects discharged inward from adjacent hoppers to the inner funnel, and an outer chute section for guiding the objects discharged outward from adjacent hoppers to the first outer funnel or to the second outer funnel, the inner chute section and the outer chute section being joined to each other in a tubular shape.

In accordance with this configuration, since the inner funnel and the first and second outer funnels are placed below the plurality of upper chutes, the inner funnel and the first and second outer funnels can be reduced in size, and can be easily removably mounted, cleaned, etc.

The above and further objects, features, and advantages of the invention will more fully be apparent from the following detailed description with accompanying drawings.

BRIEF DESCRIPTION OF THE DRAWINGS

FIG. 1 A is a side view of an exemplary combination weigher according to an embodiment of the present invention, when viewed from one side.

FIG. 1B is a side view of the combination weigher of FIG. 1A, when viewed from the other side.

FIG. 1C is a view of the combination weigher of FIG. 1A, when viewed from above.

FIG. 1D is a view of the combination weigher of FIG. 1A, when viewed from below.

DESCRIPTION OF THE PREFERRED EMBODIMENTS

Hereinafter, a preferred embodiment of the present invention will be described with reference to the drawings. Throughout the drawings, the same or corresponding components are designated by the same reference symbols and will not be described repeatedly. The present invention is not limited to the embodiment described below.

Figure 2:
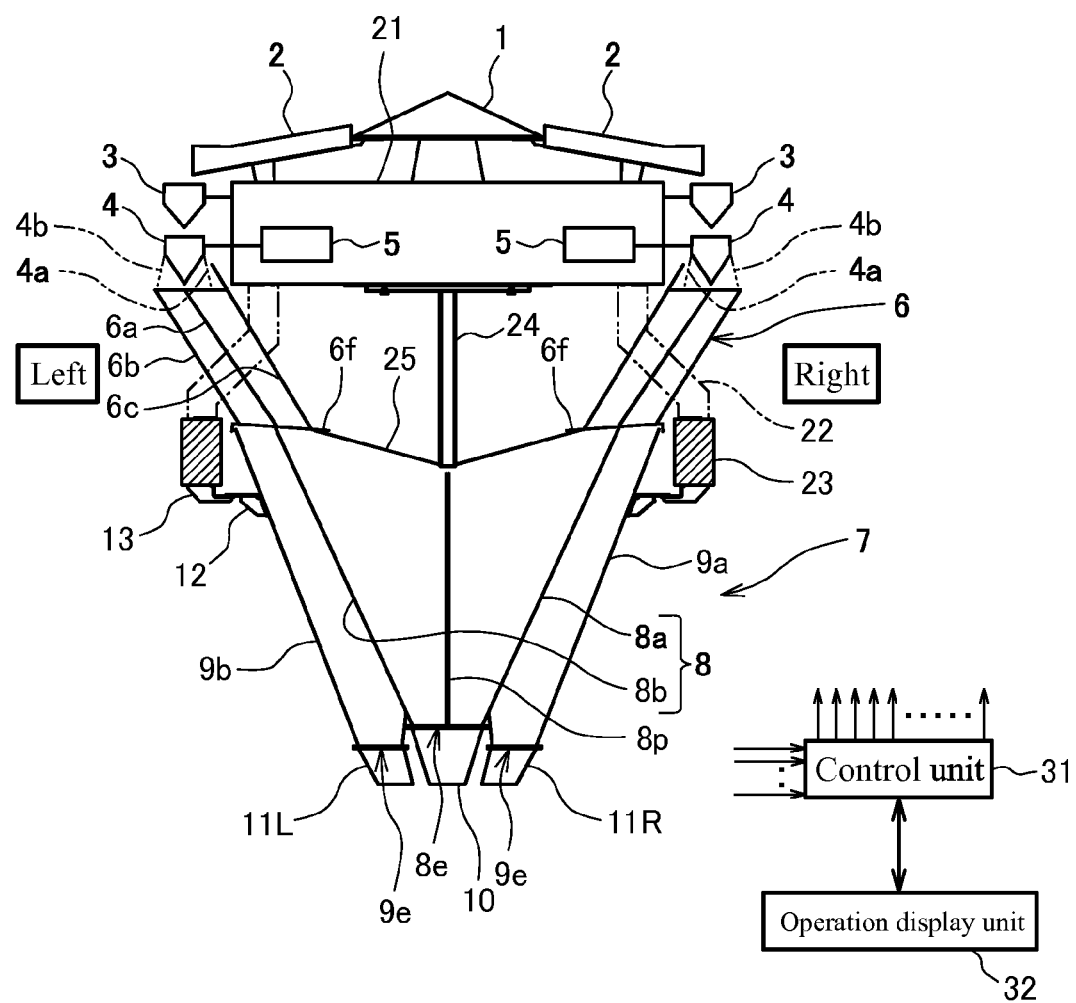
FIG. 2 is a schematic view showing the combination weigher of FIGS. 1A to 1D when viewed from one side, a part of which is shown in cross-section.

FIG. 1 A is a side view of an exemplary combination weigher according to the embodiment of the present invention, when viewed from one side (first side). FIG. 1B is a side view of the combination weigher, when viewed from the other side (second side). FIG. 1C is a view of the combination weigher, when viewed from above. FIG. 1D is a view of the combination weigher, when viewed from below. FIG. 2 is a schematic view showing the combination weigher of FIGS. 1A to 1D when viewed from one side, a part of which is shown in cross-section. Hereinafter, as shown in FIG. 1A and FIG. 2, one side of the combination weigher is a right side and the other side (opposite side of one side) is a left side.

As shown in FIG. 2, the combination weigher includes a center base body 21 in a center thereof. The center base body 21 is supported by a plurality of support legs 22 fastened to a mounting plate 23. The mounting plate 23 is supported on a floor or the like by a plurality of support columns (not shown). A dispersion feeder 1, linear feeders 2, feeding hoppers 3, and weighing hoppers 4 are mounted to the center base body 21, and driving units thereof are accommodated within the center base body 21.

The dispersion feeder 1 has a conical shape and radially disperses by vibration objects supplied from an outside supply device. The plurality of linear feeders 2 are provided around the dispersion feeder 1 to feed by vibration to the feeding hoppers 3, the objects delivered from the dispersion feeder 1. Below the linear feeders 2, the feeding hoppers 3 are provided. Below the feeding hoppers 3, the weighing hoppers 4 are provided and fed with the objects discharged from the feeding hoppers 3. The plurality of feeding hoppers 3 and the plurality of weighing hoppers 4 are arranged in a circular shape around the center base body 21. The linear feeders 2, the feeding hoppers 3 and the weighing hoppers 4 correspond to each other. In the present example, each of the number of the linear feeders 2, the number of the feeding hoppers 3, and the number of the weighing hoppers 4 is 28 (see FIG. 1C).

The weighing hopper 4 holds the objects fed from the feeding hopper 3 for a specified time, and a weight sensor 5 measures the weight of the objects held therein. The weight sensor 5 is constituted by a load cell or the like, and mounted inside the center base body 21 such that the weight sensor 5 supports the weighing hopper 4. The weight sensor 5 outputs a measured weight value to a control unit 31.

The weighing hopper 4 includes an inner gate 4a for discharging the objects inward in the circular shape in which the weighing hoppers 4 are arranged, and an outer gate 4b for discharging the objects outward in the circular shape. The weighing hopper 4 is able to selectively discharge the objects held therein inward or outward.

A plurality of upper chutes 6 are arranged in the circular shape below the plurality of weighing hoppers 4 arranged in the circular shape. A collecting funnel 7 is placed below the upper chutes 6. The plurality of upper chutes 6 and the collecting funnel 7 constitute the collecting chute.

Figure 3:
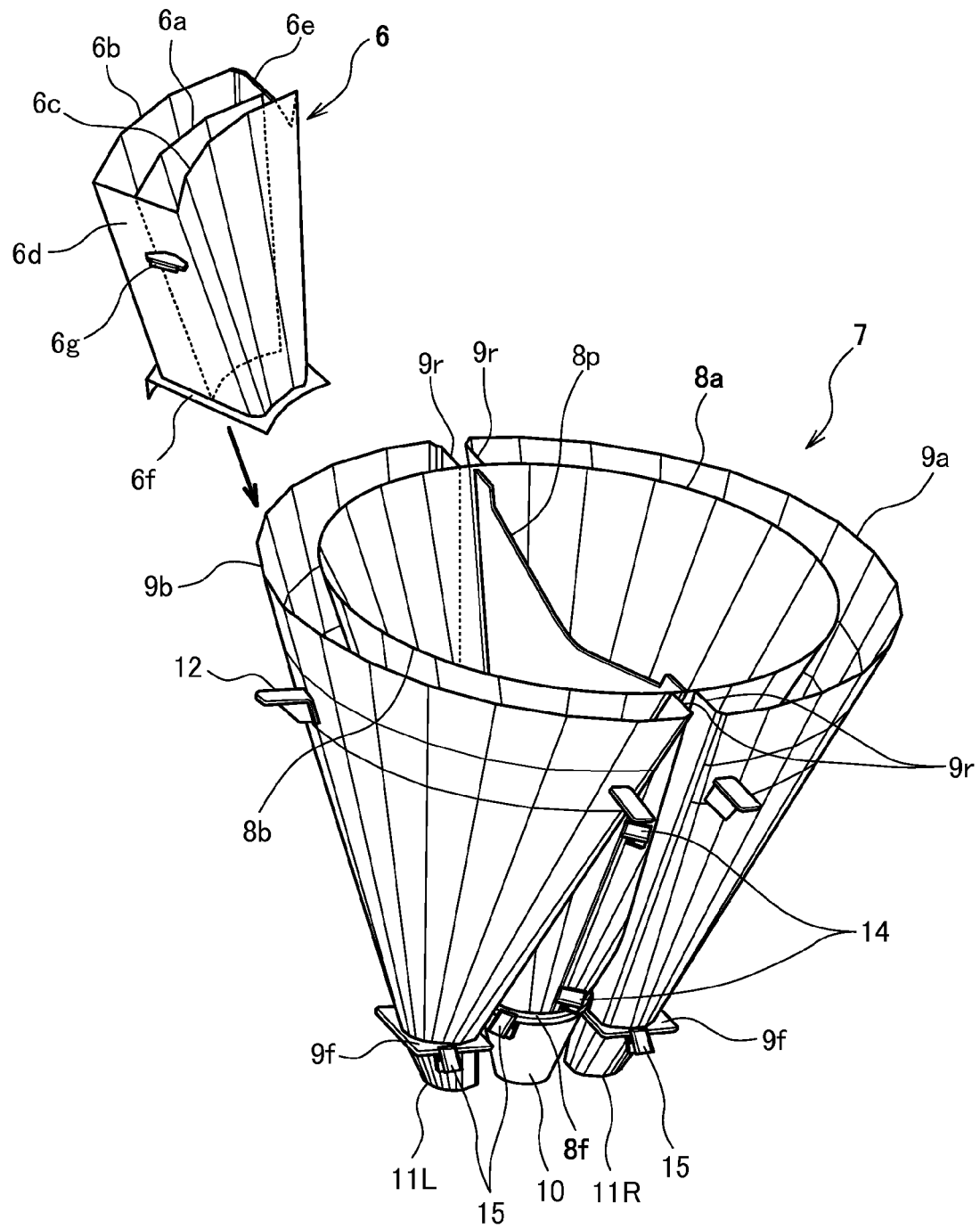
FIG. 3 is a perspective view showing one of upper chutes and a collecting funnel when viewed from obliquely above.

FIG. 3 is a perspective view showing one of the upper chutes 6 and the collecting funnel 7 when viewed from obliquely above.

Each of the upper chutes 6 is provided to correspond to a plurality of (in this example, 2 or 3) weighing hoppers 4 placed adjacently. Each of the upper chutes 6 has a double-walled tubular shape. As shown in FIG. 3, the upper chute 6 includes an inner chute section 6a, an outer chute section 6b, a cover section 6c, and connecting sections 6d, 6e connecting the end portions of the cover section 6c, the end portions of the inner chute section 6a and the end portions of the outer chute section 6b. In addition, the upper chute 6 includes at the periphery of a lower end thereof a cover section 6f for covering a gap or the like with adjacent upper chute 6 to prevent ingress of trash or the like from outside. In this way, it becomes possible to prevent the ingress of the trash or the like into the collecting funnel 7.

The connecting sections 6d, 6e are attached with brackets 6g on outer surfaces thereof, respectively. As shown in FIG. 1A, the upper chute 6 is mounted in such a manner that the brackets 6g are hooked in a hook (not shown) provided in the support leg 22 fastened to the mounting plate 23 and a hook (not shown) provided in a hook mounting leg 26 fastened to the mounting plate 23. As shown in FIG. 1B, the upper chute 6 is provided with two handles 6t which are easily held by an operator or the like.

The collecting funnel 7 includes an inner funnel 8, a partition plate 8p placed inside the inner funnel 8, a right outer funnel 9a defining a right outer discharge path, and a left outer funnel 9b defining a left outer discharge path.

The inner funnel 8 includes a right inner funnel section 8a and a left inner funnel section 8b. The inner funnel 8 has a substantially circular opening in an upper portion thereof, and a substantially circular opening 8e in a lower end thereof. Thus, the inner funnel 8 has a funnel shape. The right inner funnel section 8a and the left inner funnel section 8b are right and left parts into which the inner funnel 8 is equally divided in two at a vertical plane. The partition plate 8p is placed to include a center axis of the funnel shape of the inner funnel 8. The partition plate 8p separates the inner region of the inner funnel 8 into a right region (inner region of the right inner funnel section 8a) and a left region (inner region of the left inner funnel section 8b). In this structure, two discharge paths, i.e., right and left discharge paths are formed by the partition plate 8p and the inner funnel 8. The inner funnel 8 is attached with a lower funnel 10 in the opening 8e at the lower end of the inner funnel 8.

The right outer funnel 9a is placed along the right side of the inner funnel 8. The right outer funnel 9a has at a lower end thereof a discharge outlet 9e formed by an opening. The left outer funnel 9b is placed along the left side of the inner funnel 8. The left outer funnel 9b has at a lower end thereof a discharge outlet 9e formed by an opening. The discharge outlet 9e of the right outer funnel 9a and the discharge outlet 9e of the left outer funnel 9b are attached with lower funnels 11R, 11L, respectively.

Below the center base body 21, a foreign matter accumulating section 25 of an inverted cone shape is placed such that a support member 24 is interposed between the center base body 21 and the foreign matter accumulating section 25. The foreign matter accumulating section 25 is placed such that its peripheral end portion lies along the underside of the inner side of the cover sections 6f of the upper chutes 6. Foreign matters such as old objects or trash falling from the center base body 21, or the like, slide down on the cover sections 6c of the upper chutes 6 and are accumulated in the foreign matter accumulating section 25. This can prevent ingress of the foreign matters into the discharge paths. Therefore, a hygiene aspect in the discharge paths can be improved. For this reason, it is very desirable to provide the foreign matter accumulating section 25, in a case where the objects such as food which requires good hygiene are treated.

Figure 4C:
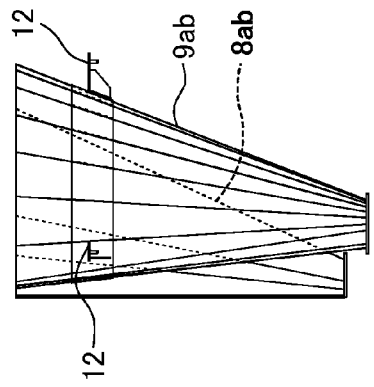
FIG. 4C is a side view of the funnel component of FIG. 4A.
Figure 4B:
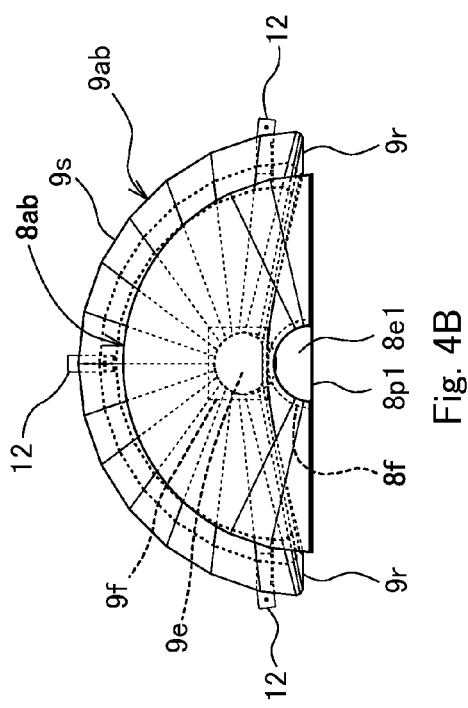
FIG. 4B is a plan view of the funnel component of FIG. 4A when viewed from above.
Figure 4A:
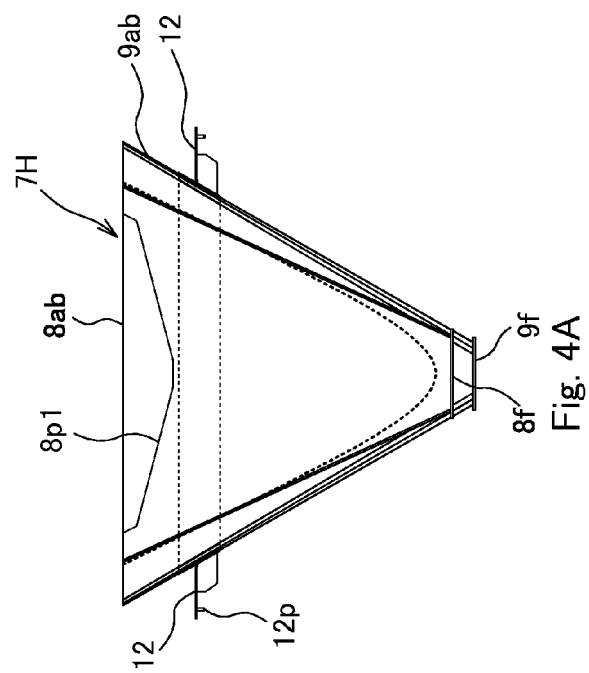
FIG. 4A is a front view of a funnel component which is an exemplary component of the collecting funnel.

FIG. 4A is a front view of a funnel component which is an exemplary component of the collecting funnel 7. FIG. 4B is a plan view of the funnel component, when viewed from above. FIG. 4C is a side view of the funnel component.

The funnel component 7H is configured such that an outer funnel section 9ab, a half inner funnel section 8ab, and a vertical plate 8p1 of a substantially inverted trapezoid shape are joined to each other. The collecting funnel 7 is formed by connecting the two funnel components 7H to each other. The outer funnel section 9ab and the half inner funnel section 8ab of one of the two funnel components 7H become the right outer funnel 9a and the right inner funnel section 8a, respectively. The outer funnel section 9ab and the half inner funnel section 8ab of the other of the two funnel components 7H become the left outer funnel 9b and the left inner funnel section 8b, respectively.

The outer funnel section 9ab includes a chute section 9s which is provided with the discharge outlet 9e at a lower end thereof and placed along the side of the half inner funnel section 8ab, and two connecting sections 9r connecting the both edges of the chute section 9s to the outer side surface of the half inner funnel section 8ab. The chute section 9s of the outer funnel section 9ab is placed with a gap with the outer side surface of the half inner funnel section 8ab. The objects are moved down through this gap. The connecting sections 9r of the outer funnel section 9ab extend from the edges of the chute section 9s and are joined to the outer side surface of the half inner funnel section 8ab by, for example, welding. A flange 9f is provided around the discharge outlet 9e.

The both edge portions of the half inner funnel section 8ab are joined to the vertical plate 8p1 of the substantially inverted trapezoid shape. The half inner funnel section 8ab has a semicircular opening 8e1 at a lower end thereof. A flange 8f is provided around the circular-arc portion of the opening 8e1.

The two funnel components 7H configured as described are prepared and placed such that the vertical plates 8p1 are entirely joined to each other. Thus, the collecting funnel 7 is assembled. In this example, the partition plate 8p of the inner funnel 8 is formed by the two vertical plates 8p1 joined to each other. The opening 8e at the lower end of the inner funnel 8 is formed by the two semicircular openings 8e1.

Three hook members 12 are mounted to the outer side surface of the outer funnel section 9ab. The hook members 12 are provided with pins 12p, respectively, protruding downward. As shown in FIG. 1A, the mounting plate 23 is provided with a plurality of brackets 13 to which the hook members 12 are mounted, respectively.

When the collecting funnel 7 (two funnel components 7H) is mounted, the hook members 12 are mounted to the brackets 13 of the mounting plate 23. Protrusions (not shown) protruding outward are provided at upper and lower sides of the both edge portions of the half inner funnel section 8ab which are joined to the vertical plate 8p1 in each of the funnel components 7H. The protrusions of the two funnel components 7H are joined to each other and retained by a plurality of retaining members 14 such as clips (FIG. 3).

The above described method of assembling the collecting funnel 7 by using the two funnel components 7H is merely exemplary and the assembling method is not limited to this. Also, the partition plate 8p may be formed by one metal plate.

Figure 5A:
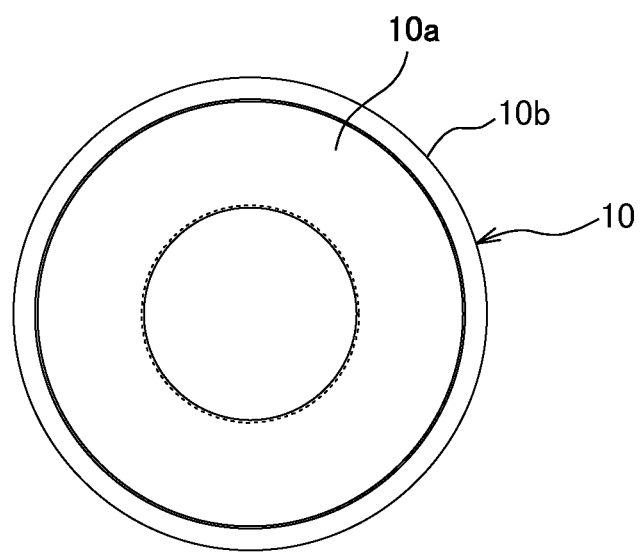
FIG. 5A is a plan view of a lower funnel at a center when viewed from above.
Figure 5B:
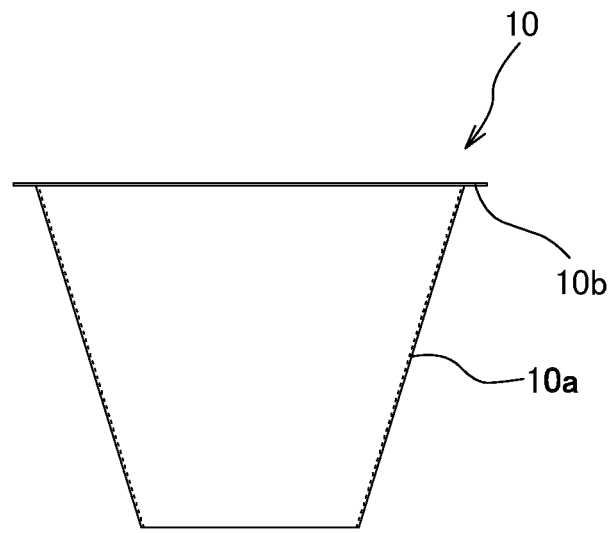
FIG. 5B is a side view of the lower funnel of FIG. 5A.

FIG. 5A is a plan view of the lower funnel 10 when viewed from above. FIG. 5B is a side view of the lower funnel 10. The lower funnel 10 includes a tubular section 10a and a flange 10b provided around the upper end of the tubular section 10a.

By bringing the flange 10b of the lower funnel 10 into contact with the flange 8f at the lower end of the inner funnel 8 and retaining them by using a plurality of retaining members 15 (FIG. 3) such as clips, the lower funnel 10 is mounted to the inner funnel 8.

Figure 6A:
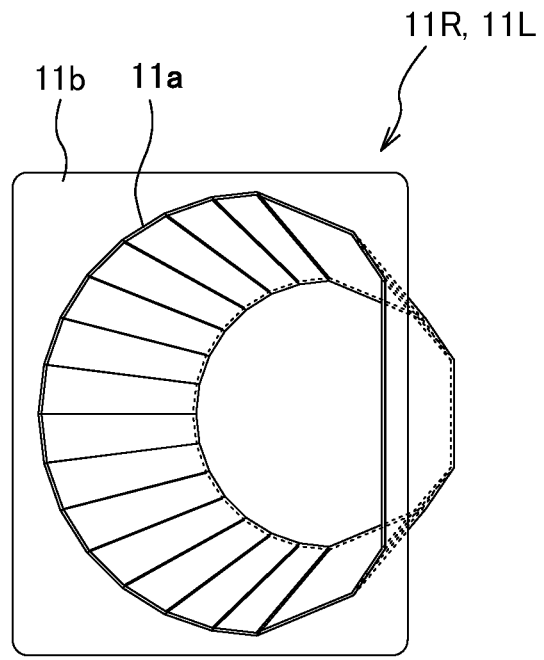
FIG. 6A is a plan view of a lower funnel at a right side or a left side when viewed from above.
Figure 6B:
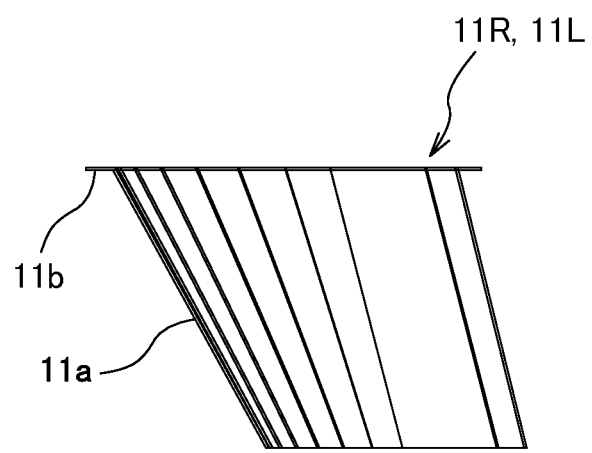
FIG. 6B is a side view of the lower funnel of FIG. 6A.

FIG. 6A is a plan view of the lower funnel 11R or 11L when viewed from above. FIG. 6B is a side view of the lower funnel 11R or 11L. The two lower funnels 11R, 11L have the same shape. Each of the lower funnels 11R, 11L includes a tubular section 11a and a flange 11b provided around the upper end of the tubular section 11a.

By bringing the flanges 11b of the lower funnels 11R, 11L into contact with the flanges 9f at the lower ends of the right and left outer funnels 9a, 9b, and retaining them by using a plurality of retaining members 15 such as clips, the lower funnels 11R, 11L are mounted to the outer funnels 9a, 9b, respectively. At this time, the lower funnels 11R, 11L are mounted to the outer funnels 9a, 9b, respectively in such a manner that the openings at the upper ends of the tubular sections 11a of the lower funnels 11R, 11L correspond in shape to the discharge outlets 9e of the outer funnels 9a, 9b, respectively.

In the combination weigher configured as described above, the discharge operation takes place as follows. When the inner gates 4a of the weighing hoppers 4 in a right group placed at a right side (hereinafter will be referred to as "right group 4R"), among all of the weighing hoppers 4 arranged in the circular shape, are opened to discharge the objects, the objects slide down on the inner chute section 6a of the upper chute 6 placed at a right side and then the right inner funnel section 8a, and then are discharged through the lower funnel 10 at the center.

By comparison, when the inner gates 4a of the weighing hoppers 4 in a left group placed at a left side (hereinafter will be referred to as "left group 4L"), among all of the weighing hoppers 4, are opened to discharge the objects, the objects slide down on the inner chute section 6a of the upper chute 6 placed at a left side and then the left inner funnel section 8b, and then are discharged through the lower funnel 10 at the center.

When the outer gates 4b of the weighing hoppers 4 in the right group 4R are opened to discharge the objects, the objects slide down on the outer chute section 6b of the upper chute 6 placed at a right side and then the right outer funnel 9a, and then are discharged through the lower funnel 11R at a right side.

By comparison, when the outer gates 4b of the weighing hoppers 4 in the left group 4L are opened to discharge the objects, the objects slide down on the outer chute section 6b of the upper chute 6 placed at a left side and then the left outer funnel 9b, and then are discharged through the lower funnel 11L at a left side.

The right inner funnel section 8a and the right outer funnel 9a correspond to all of the weighing hoppers 4 in the right group 4R. The left inner funnel section 8b and the left outer funnel 9b correspond to all of the weighing hoppers 4 in the left group 4L.

Below the combination weigher, for example, a packaging machine (not shown) having three inlets of the objects is placed. The shapes of the lower ends of the lower funnels 10, 11R, 11L are defined to correspond to the three inlets of the packaging machine such that these lower ends are placed to these inlets, respectively. The objects discharged through the lower funnels 10, 11R, 11L are fed into the corresponding inlets of the packaging machine, respectively, and packaged therein.

An operation display unit 32 is constituted by, for example, a touch panel display, or the like. The operation display unit 32 includes an input unit used to input commands for causing the combination weigher to be started, stopped, etc., to set combination conditions, etc., and a display unit which displays on a screen (display screen), a running speed of the combination weigher, results of a combination process such as combination weights, etc. The control unit 31 receives a command signal from the operation display unit 32 and outputs signals of data and the like to be displayed on the operation display unit 32.

The control unit 31 is constituted by, for example, a microcontroller including a CPU, and memories such as ROM and RAM for storing operation programs and operation parameters, or the like of the CPU. The CPU executes the operation programs stored in the ROM to control the operation of the entire combination weigher. The control unit 31 controls the vibration operations of the dispersion feeder 1 and the linear feeders 2, and the opening/closing operations of the discharge gates of the feeding hoppers 3 and the opening/closing operations of the discharge gates of the weighing hoppers 4.

The control unit 31 is not necessarily constituted by a single control unit but may be composed by a plurality of control units which are distributed and cooperate with each other to control the operation of the combination weigher.

In this combination weigher, by operating the operation display unit 32, one operation mode can be selected from among a plurality of operation modes and set in the control unit 31. The control unit 31 performs a combination process to find a combination of the weighing hoppers 4 which discharge the objects according to the set operation mode. In other words, the operation display unit 32 has a function as a mode select unit. The control unit 31 has a function of a combination unit and a control unit.

In the present embodiment, by operating the operation display unit 32 to select one operation mode from among first to third operation modes, the selected operation mode can be set in the control unit 31. The combination process is different depending on the set operation mode.

In the present example, the first operation mode is set in the control unit 31. In the combination process in the first operation mode, the control unit 31 finds a combination (hereinafter will be referred to as "proper-amount combination") of the weighing hoppers 4 in which a total weight of the objects held therein falls within a predetermined weight range, from among the weighing hoppers 4 in the right group 4R and decides this proper-amount combination as a discharge combination a. In addition, the control unit 31 finds a proper-amount discharge combination from among the weighing hoppers 4 in the left group 4L and decides this proper-amount combination as a discharge combination b. Furthermore, the control unit 31 finds a proper-amount discharge combination from among all of the weighing hoppers 4 and decides this proper-amount combination as a discharge combination c. Note that the discharge combinations a, b, and the discharge combination c do not include the same weighing hopper 4.

Then, the control unit 31 causes the weighing hoppers 4 selected to make up the discharge combinations a, b, c to discharge the objects at the same time at a predetermined timing. At this time, the weighing hoppers 4 selected to make up the discharge combination a and the discharge combination b open the outer gates 4b to discharge the objects, while the weighing hoppers 4 selected to make up discharge combination c open the inner gates 4a to discharge the objects. Thereby, the objects discharged from the weighing hoppers 4 making up the discharge combination a are discharged through the right lower funnel 11R, the objects discharged from the weighing hoppers 4 making up the discharge combination b are discharged through the left lower funnel 11L, and the objects discharged from the weighing hoppers 4 making up the discharge combination c are discharged through the center lower funnel 10.

The control unit 31 opens the discharge gates of the feeding hoppers 3 located above the weighing hoppers 4 which have discharged the objects and are now empty, to discharge the objects to be fed to the weighing hoppers 4. In addition, the control unit 31 actuates the linear feeders 2 corresponding to the empty feeding hoppers 3 to feed the objects to the empty feeding hoppers 3. Concurrently with this, the control unit 31 actuates the dispersion feeder 1 to feed the objects to the linear feeders 2. The control unit 31 performs the combination process repeatedly, and causes the dispersion feeder 1, the linear feeders 2, the feeding hoppers 3 and the weighing hoppers 4 to perform the above described operation every time the control unit 31 performs the above combination process. The same applies to the second mode and the third mode as will be described later.

The timing at which the weighing hoppers 4 selected to make up the discharge combinations a, b, c discharge the objects, as described above, is merely exemplary, and is not limited to the above. For example, the discharge combinations a, b, c may be found at different times, and according to this, the weighing hoppers 4 selected to make up the discharge combinations a, b, c may discharge the objects at different timings.

Figure 7:
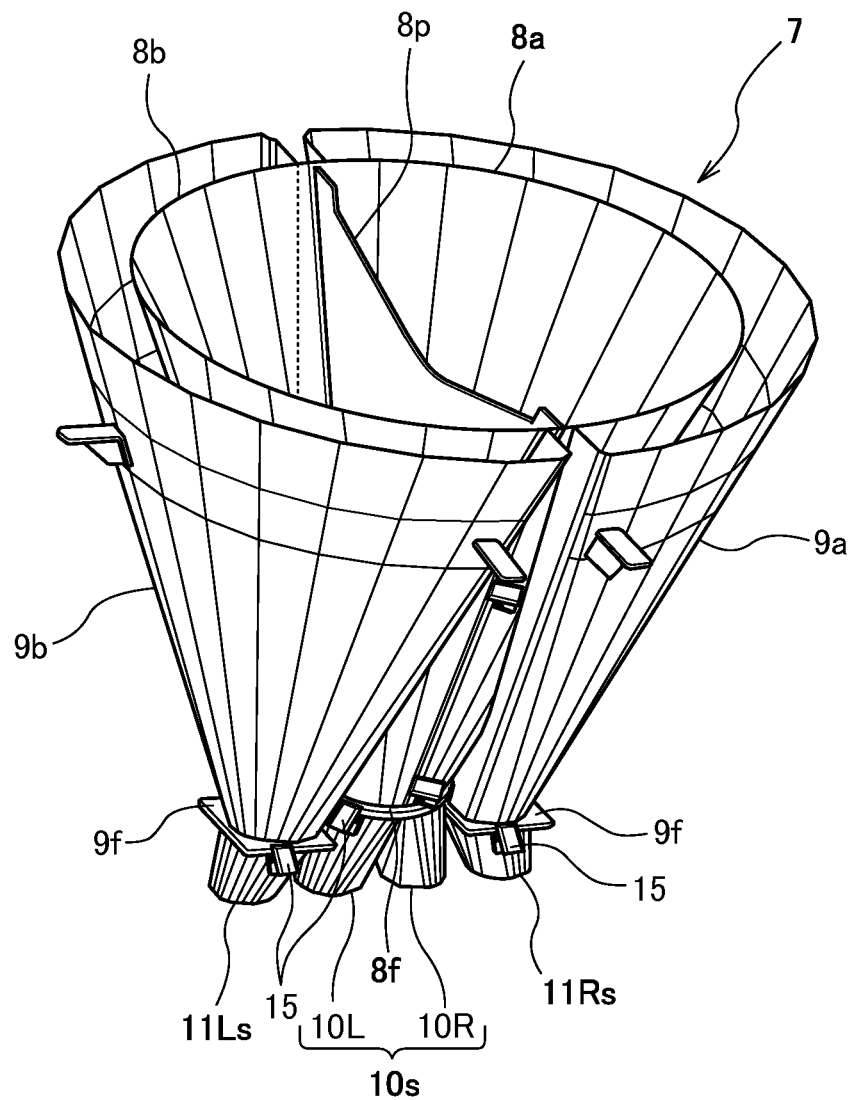
FIG. 7 is a perspective view showing the configuration of the collecting funnel and the lower funnel in a case where a second operation mode is selected.

Next, a case where the second operation mode is set in the control unit 31 will be described. FIG. 7 is a perspective view showing the configuration of the collecting funnel and the lower funnels in a case where second operation mode is set in the control unit 31.

In a case where the second operation mode is set in the control unit 31, lower funnels 10s, 11Rs, 11Ls of FIG. 7 are mounted to the lower end of the collecting funnel 7 instead of the above described lower funnels 10, 11R, 11L.

The lower funnel 10s (joint funnel) at the center includes two tubular funnel sections 10R, 10L which are joined to each other. A flange having the same shape as that of the flange 10b of the lower funnel 10 is provided at the upper end portion of the lower funnel 10s. By bringing this flange of the lower funnel 10s into contact with the flange 8f at the lower end of the inner funnel 8 and retaining them by a plurality of retaining members 15, the lower funnel 10s is mounted to the lower end of the inner funnel 8. The openings at the upper ends of the funnel sections 10R, 10L have a semicircular shape. These openings are joined to the two semicircular openings 8e1 (FIG. 4B) of the inner funnel 8. This allows all of the objects sliding down on the right inner funnel section 8a to be discharged through the right funnel section 10R, and all of the objects sliding down on the left inner funnel section 8b to be discharged through the left funnel section 10L.

The right and left lower funnels 11Rs, 11Ls are different only in inclination direction from the above stated lower funnels 11R, 11L.

In this case, below the combination weigher, for example, a packaging machine (not shown) having four inlets of the objects is placed. The shapes of the lower ends of the lower funnels 11Rs, 11Ls, and the funnel sections 10R, 10L are defined to correspond to the four inlets of the packaging machine such that these lower ends are placed to these four inlets, respectively. The objects discharged through the lower funnels 11Rs, 11Ls, and the funnel sections 10R, 10L are fed into the corresponding inlets of the packaging machine, respectively, and packaged therein.

In the combination process in the second operation mode, the control unit 31 finds two proper-amount combinations from among the weighing hoppers 4 in the right group 4R and decides these two proper-amount combinations as discharge combinations a1, a2. In addition, the control unit 31 finds two proper-amount combinations from among the weighing hoppers 4 in the left group 4L and decides these two proper-amount combinations as discharge combinations b1, b2. The discharge combinations a1, a2, and the discharge combinations b1, b2 are decided such that the discharge combinations a1, a2 do not include the same weighing hopper 4 and the discharge combinations b1, b2 do not include the same weighing hopper 4.

Then, the control unit 31 causes the weighing hoppers 4 selected to make up the discharge combinations a1, a2, b1, b2 to discharge the objects at the same time at a predetermined timing. At this time, the weighing hoppers 4 selected to make up the discharge combinations a1, b1 open the outer gates 4b to discharge the objects, while the weighing hoppers 4 selected to make up the discharge combinations a2, b2 open the inner gates 4a to discharge the objects. Thereby, the objects discharged from the weighing hoppers 4 making up the discharge combination a1 are discharged through the right lower funnel 11R, and the objects discharged from the weighing hoppers 4 making up the discharge combination b1 are discharged through the left lower funnel 11L. Also, the objects discharged from the weighing hoppers 4 making up the discharge combination a2 are discharged through the funnel section 10R, and the objects discharged from the weighing hoppers 4 making up the discharge combination b2 are discharged through the funnel section 10L.

The timing at which the weighing hoppers 4 selected to make up the discharge combinations a1, a2, b1, b2 discharge the objects, as described above, is merely exemplary, and is not limited to the above. For example, the discharge combinations a1, a2, b1, b2 may be found at different times, and according to this, the weighing hoppers 4 selected to make up the discharge combinations a1, a2, b1, b2 may discharge the objects at different timings.

Next, a case where the third operation mode is set in the control unit 31 will be described. In this case, for example, the lower funnels 10, 11R, 11L of FIG. 2 are mounted to the lower end of the collecting funnel 7.

In the combination process in the third operation mode, the control unit 31 finds a proper-amount combination from among the weighing hoppers 4 in the right group 4R and decides this proper-amount combination as a discharge combination a3. In addition, the control unit 31 finds a proper-amount combination from among the weighing hoppers 4 in the left group 4L and decides this proper-amount combination as a discharge combination b3.

Then, the control unit 31 causes the weighing hoppers 4 selected to make up the discharge combination a3, b3 to discharge the objects at the same time at a predetermined timing. At this time, the weighing hoppers 4 selected to make up the discharge combination a3 and the discharge combination b3 open the outer gates 4b to discharge the objects. Thereby, the objects discharged from the weighing hoppers 4 making up the discharge combination a3 are discharged through the right lower funnel 11R, and the objects discharged from the weighing hoppers 4 making up the discharge combination b3 are discharged through the left lower funnel 11L.

In this case, below the combination weigher, for example, a packaging machine (not shown) having two inlets of the objects is placed. The lower ends of the right and left lower funnels 11R, 11L are placed so as to correspond to these two inlets of the packaging machine, respectively. The objects discharged through the lower funnels 11R, 11L are fed into the corresponding inlets of the packaging machine, respectively, and packaged therein.

The timing at which the weighing hoppers 4 selected to make up the discharge combinations a3, b3 discharge the objects, as described above, is merely exemplary, and is not limited to the above. For example, the discharge combinations a3, b3 may be found at different times, and according to this, the weighing hoppers 4 selected to make up the discharge combinations a3, b3 may discharge the objects at different timings.

In this case, the objects discharged from the weighing hoppers 4 selected to make up the discharge combinations a3, b3 are not moved down through inside of the inner funnel 8. In this configuration, the weighing hopper 4 holding the objects with a large weight is less likely to be selected to make up the discharge combination (proper-amount combination). Therefore, for example, in a case where the weighing hopper 4 holding the objects with a predetermined weight or larger exists, the inner gate 4a of this weighing hopper 4 may be opened to discharge the objects and the objects may be discharged through the lower funnel 10 at the center.

Figure 8A:
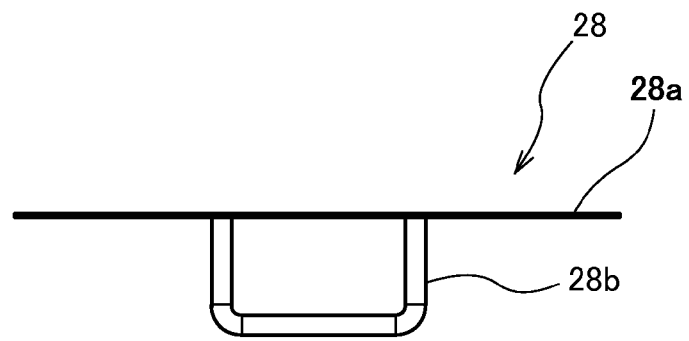
FIG. 8A is a side view of a lid mounted to an opening at a lower end of an inner funnel.
Figure 8B:
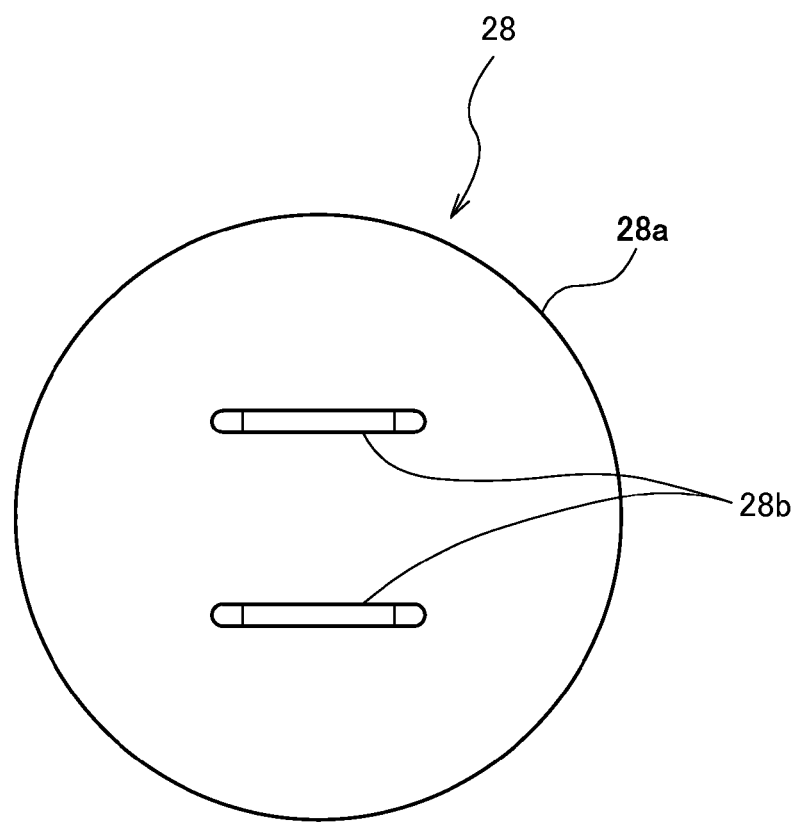
FIG. 8B is a view of the lid of FIG. 8A when viewed from below.

Or, the foreign matter accumulating section 25 may be detached together with the support member 24 from the center base body 21, and the lower funnel 10 at the center may be detached. Then, a lid may be mounted to the opening 8e at the lower end of the inner funnel 8. FIG. 8A is a side view of a lid 28 mounted to the opening 8e of the lower end of the inner funnel 8. FIG. 8B is a view of the lid 28 when viewed from below. The lid 28 includes a circular lid body 28a which is equal in size to the outer periphery of the flange 10b of the lower funnel 10, and a handle 28b mounted to the lid body 28a. The lid 28 is mounted to the opening 8e at the lower end of the inner funnel 8 as in the case of the lower funnel 10. In the case, foreign matters may be accumulated on the lid 28.

Or, the lower funnel 10s of FIG. 7 may be mounted to the opening 8e of the inner funnel 8. In this configuration, the inner gates 4a of the weighing hoppers 4 selected to make up the discharge combinations a3, b3 may be opened to discharge the objects, and the objects discharged from the weighing hoppers 4 may be fed into the inlets of the packaging machine through the right inner funnel section 8a and the left inner funnel section 8b, and then the funnel sections 10R, 10L.

In the present embodiment, the partition plate 8p is provided inside the inner funnel 8. Because of the presence of the partition plate 8p, the objects discharged inward from the weighing hoppers 4 in the right group 4R are discharged through the region of the right inner funnel section 8a and the right discharge outlet (right semicircular opening 8e1) of the inner funnel 8, while the objects discharged inward from the weighing hoppers 4 in the left group 4L are discharged through the region of the left inner funnel section 8b and the left discharge outlet (left semicircular opening 8e1) of the inner funnel 8. This makes it possible to discharge the objects inward from the weighing hoppers 4 in the right group 4R and the weighing hoppers 4 in the left group 4L such that the objects in the right group 4R are separate from the objects in the left group 4L.

For example, as shown in FIG. 7, the lower funnel 10s including the two funnel sections 10R, 10L joined to each other are mounted to the lower end of the inner funnel 8, and the lower funnels 11Rs, 11Ls are mounted to the lower ends of the right and left outer funnels 9a, 9b, respectively. This makes it possible to discharge the objects to desired four locations. Or, as shown in FIG. 2, etc., the lower funnel 10 is mounted to the lower end of the inner funnel 8, and the lower funnels 11R, 11L are mounted to the lower ends of the right and left outer funnels 9a, 9b, respectively. This makes it possible to discharge the objects to desired three locations.

In brief, with a simple configuration in which the partition plate 8p is provided inside the inner funnel 8, the objects discharged inward from the weighing hoppers 4 in the right group 4R and the objects discharged inward from the weighing hoppers 4 in the left group 4L can be discharged to the same location, or to different locations. In addition, the lower funnels 10, 11R, 11L, 10s, 11Rs, 11Ls mounted to the inner funnel 8 and the outer funnels 9a, 9b are simple in configuration, and control for them is not necessary.

Although in the present embodiment, the plurality of weighing hoppers 4 and the plurality of feeding hoppers 3 are arranged in the circular shape, they may be arranged in other shape, for example, an annular shape such as an oval shape. Note that the shape of the collecting chute (upper chutes 6 and the collecting funnel 7) is decided according to the shape in which the plurality of weighing hoppers 4 are arranged.

In a case where a small-sized combination weight is used, the collecting chute may be composed of the collecting funnel 7 without using the upper chutes 6. In this case, the upper end of the inner funnel 8 may be located immediately below the weighing hoppers 4. In this configuration, the objects discharged inward from the weighing hoppers 4 may fall directly onto the upper side of the inner funnel 8, and the objects discharged outward from the weighing hoppers 4 may fall directly onto the upper sides of the right and left outer funnels 9a, 9b. However, by providing the upper chute 6, the collecting funnel 7 can be reduced in size. In addition, the upper chute 8 and the collecting funnel 7 can be easily removably mounted, cleaned, etc.

The present embodiments are effectively applicable to a combination weigher which allows objects to be discharged selectively to three locations or to four locations.

Numeral improvements and alternative embodiments of the present invention will be conceived by those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A combination weigher comprising:
a plurality of hoppers which are arranged in an annular shape and discharge objects held therein selectively inward or outward in the annular shape, the plurality of hoppers being divided into a first group and a second group;
an inner funnel having an opening at a lower end thereof, the inner funnel collecting the objects discharged inward from the hoppers, the inner funnel discharging the objects through the opening;
a first outer funnel having a first outer discharge outlet at a lower end thereof, the first outer funnel being placed along a first side of the inner funnel, the first outer funnel collecting the objects discharged outward from the hoppers in the first group, the first outer funnel discharging the objects through the first outer discharge outlet;
a second outer funnel having a second outer discharge outlet at a lower end thereof, the second outer funnel being placed along a second side of the inner funnel, the second outer funnel collecting the objects discharged outward from the hoppers in the second group, the second outer funnel discharging the objects through the second outer discharge outlet; and
a partition plate which is placed inside the inner funnel, separates an inner region of the inner funnel into two regions which are a first region corresponding to the hoppers in the first group and a second region corresponding to the hoppers in the second group, wherein the partition plate separates the opening of the inner funnel into a first inner discharge outlet corresponding to the first side and a second inner discharge outlet corresponding to the second side.

2. The combination weigher according to claim 1, further comprising:
a mode select unit for selecting one operation mode from among a plurality of operation modes including a first operation mode and a second operation mode;
a combination unit which performs:
a first combination process in which a combination of the hoppers which discharge the objects is found from among the hoppers in the first group and decided as a first outer discharge combination, a combination of the hoppers which discharge the objects is found from among the hoppers in the second group and decided as a second outer discharge combination, and a combination of the hoppers which discharge the objects is found from among the hoppers in the first group and the hoppers in the second group and decided as an inner discharge combination, when the mode select unit selects the first operation mode, and
a second combination process in which two combinations of the hoppers which discharge the objects are found from among the hoppers in the first group, one of the two combinations is decided as a first outer discharge combination, the other of the two combinations is decided as a first inner discharge combination, two combinations of the hoppers which discharge the objects are found from among the hoppers in the second group, one of the two combinations is decided as a second outer discharge combination, and the other of the two combinations is decided as a second inner discharge combination, when the mode select unit selects the second operation mode; and a control unit which performs:

a discharge process in which the hoppers selected to make up the first outer discharge combination discharge the objects outward, the hoppers selected to make up the second outer discharge combination discharge the objects outward, and the hoppers selected to make up the inner discharge combination discharge the objects inward, when the combination unit performs the first combination process, and a discharge process in which the hoppers selected to make up the first outer discharge combination discharge the objects outward, the hoppers selected to make up the second outer discharge combination discharge the objects outward, the hoppers selected to make up the first inner discharge combination discharge the objects inward, and the hoppers selected to make up the second inner discharge combination discharge the objects inward, when the combination unit performs the second combination process.

3. The combination weigher according to claim 2, further comprising:

when the mode select unit selects the first operation mode, a tubular lower funnel which is removably mounted to the opening at the lower end of the inner funnel and through which the objects discharged through the first inner discharge outlet of the inner funnel corresponding to the first side and the second inner discharge outlet of the inner funnel corresponding to the second side are moved down;

a tubular lower funnel which is removably mounted to the first outer discharge outlet at the lower end of the first outer funnel; and a tubular lower funnel which is removably mounted to the second outer discharge outlet at the lower end of the second outer funnel.

4. The combination weigher according to claim 2, further comprising:

when the mode select unit selects the second operation mode, a joint funnel including a first tubular funnel section through which the objects discharged through the first inner discharge outlet of the inner funnel corresponding to the first side are moved down and a second tubular funnel section through which the objects discharged through the second inner discharge outlet of the inner funnel corresponding to the second side are moved down such that the first and second tubular funnel sections are joined to each other, the joint funnel being removably mounted to the opening at the lower end of the inner funnel;

a tubular lower funnel which is removably mounted to the first outer discharge outlet at the lower end of the first outer funnel; and a tubular lower funnel which is removably mounted to the second outer discharge outlet at the lower end of the second outer funnel.

5. The combination weigher according to claim 1, further comprising:

a plurality of upper chutes provided above the inner funnel and the first outer funnel or the second outer funnel, each of the plurality of upper chutes including an inner chute section for guiding the objects discharged inward from adjacent hoppers to the inner funnel, and an outer chute section for guiding the objects discharged outward from adjacent hoppers to the first outer funnel or to the second outer funnel, the inner chute section and the outer chute section being joined to each other in a tubular shape.

6. The combination weigher according to claim 1, wherein the opening of the inner funnel is formed in a substantially circular shape; and the first inner discharge outlet and the second inner discharge outlet are formed in a substantially semicircular shape.

* * * * *